United States Patent [19]

Mendrala et al.

[11] 4,109,278
[45] Aug. 22, 1978

[54] VIDEO TRAVELING MATTE SYSTEM

[75] Inventors: James A. Mendrala, San Fernando; Harold L. Peterson, Hollywood, both of Calif.

[73] Assignee: Sonex International Corp., Burbank, Calif.

[21] Appl. No.: 560,583

[22] Filed: Mar. 21, 1975

[51] Int. Cl.² .................................... H04N 9/535
[52] U.S. Cl. ........................................ 358/22
[58] Field of Search ............... 358/22, 37, 181, 183; 178/DIG. 6, DIG. 34, DIG. 39, DIG. 23

[56] References Cited

U.S. PATENT DOCUMENTS

| | | | |
|---|---|---|---|
| 3,671,667 | 6/1972 | Thorpe | 178/DIG. 6 |
| 3,673,324 | 6/1972 | Ito et al. | 178/DIG. 6 |
| 3,678,182 | 7/1972 | Boxman et al. | 358/22 |
| 3,689,694 | 9/1972 | Thorpe | 178/DIG. 6 |
| 3,959,813 | 5/1976 | Legler | 358/22 |

*Primary Examiner*—John C. Martin
*Attorney, Agent, or Firm*—Robert J. Schaap

[57] ABSTRACT

A video traveling matte system is disclosed in which the video signal from a foreground television camera is examined for the presence of a particular color by an arrangement employing multipliers to multiply the differences between the red and blue components of the video signal and a luminance signal derived from the video signal by the signals from a sine/cosine potentiometer. The combined signal from the outputs of the multipliers is fed to a first comparator for comparison with a reference value, and the resulting pulses are filtered by a 4-pole active Bessel filter and compared with a reference value in a second comparator to increase the width of the pulses by a selected amount. The pulses of increased width prevent the formation of a matte outline between foreground and background images as the true and complementary values thereof are applied to alternately gate the video signals from the foreground television camera and a background television camera to a common output. The effects of shadows in the foreground image are maintained despite substitution of the background image by utilizing the combined signal from the multipliers to modulate pulses from the second comparator prior to use of such pulses to gate the video signal from the background television camera to the common output. The effects of shadows are further enhanced by a logarithmic amplifier which introduces a predetermined logarithmic transfer characteristic into the modulation signal to compensate for the black stretch circuits used in most television cameras.

34 Claims, 32 Drawing Figures

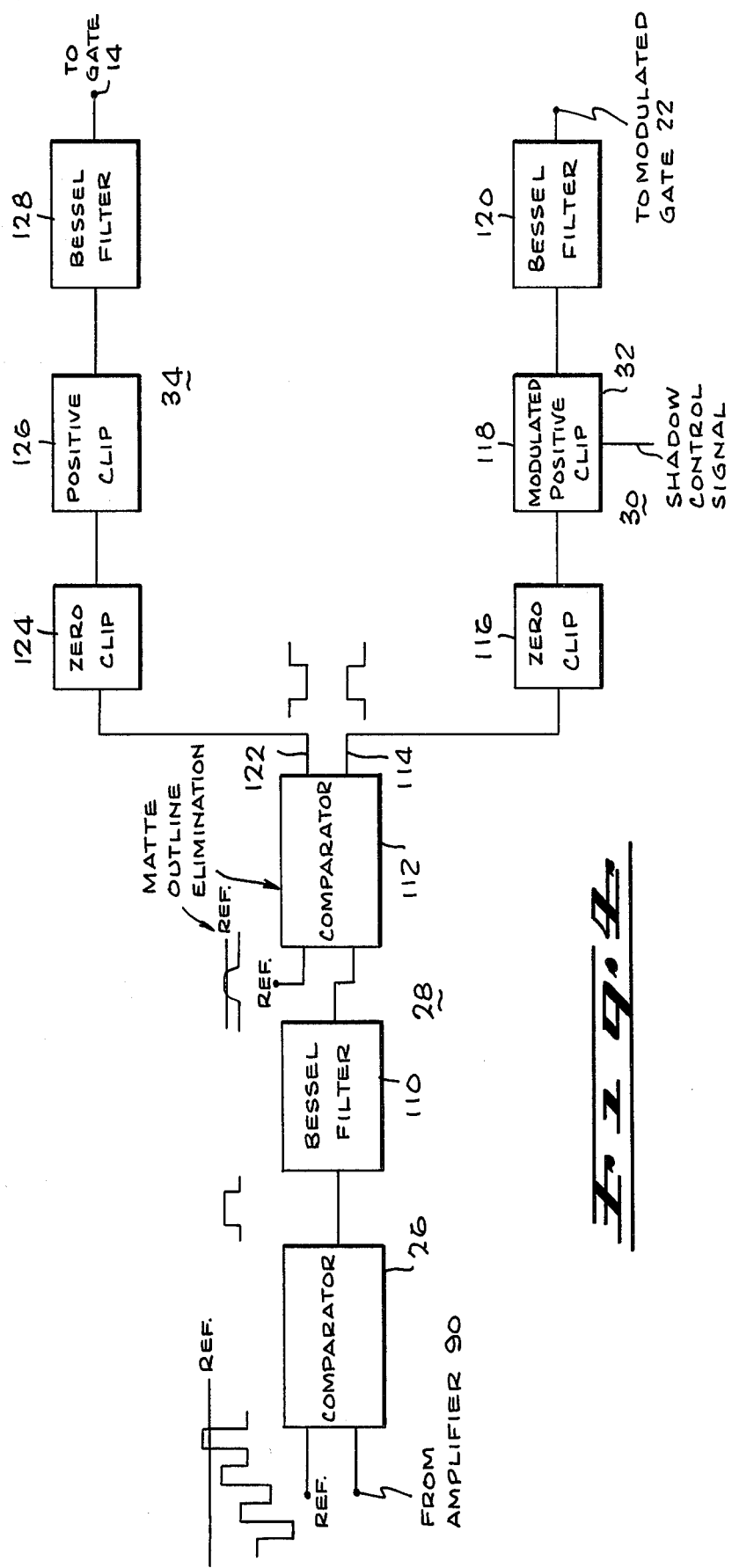

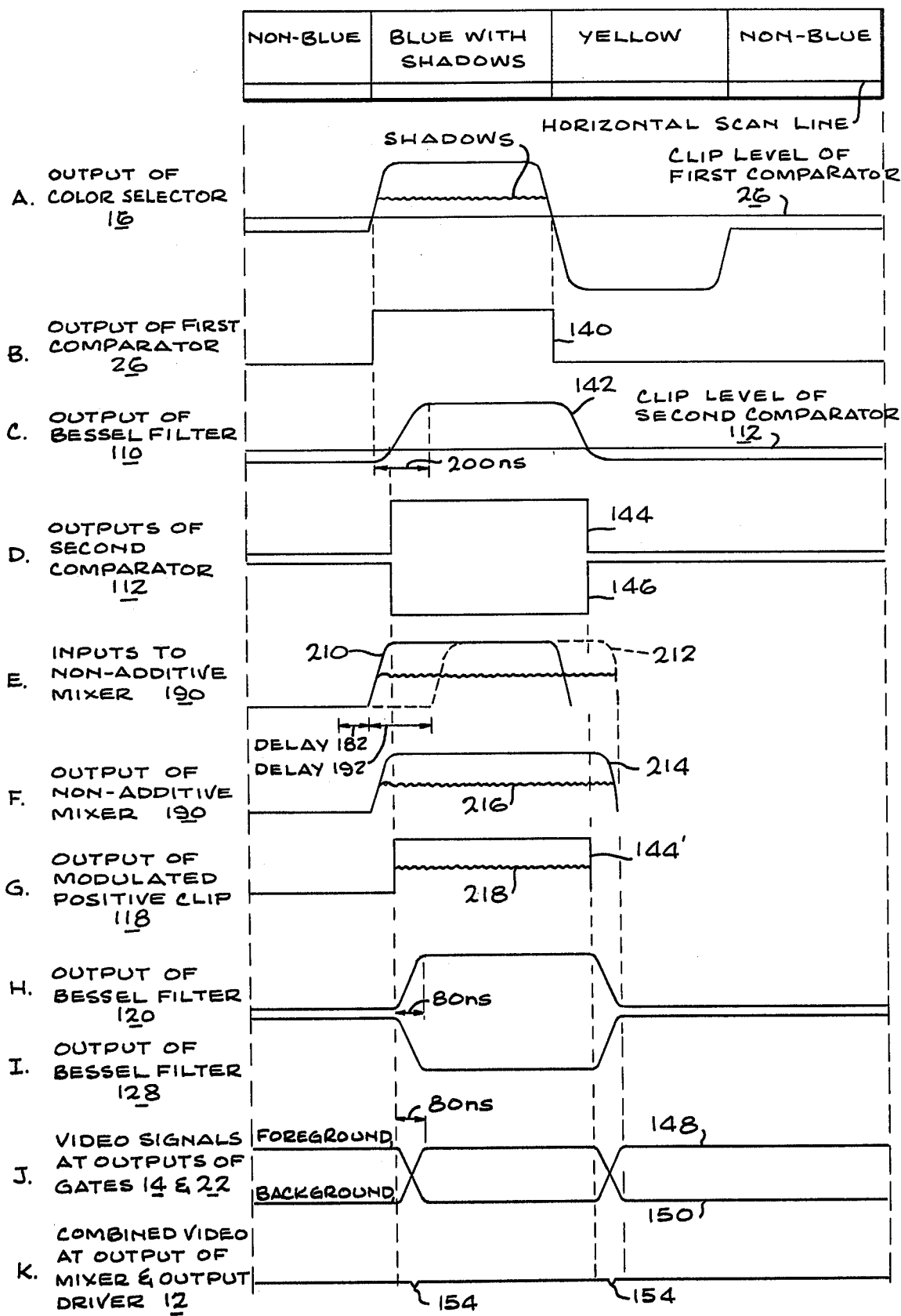

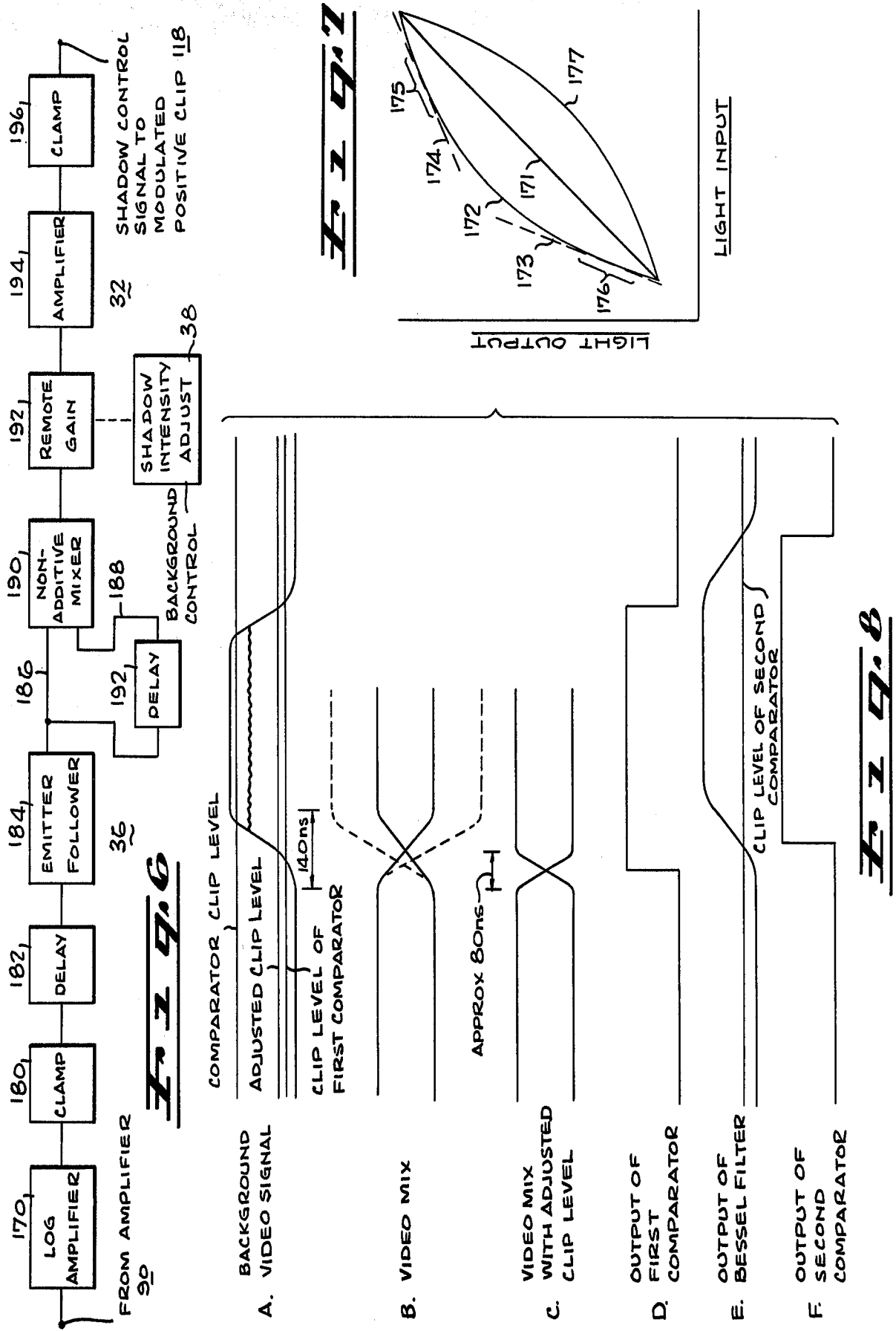

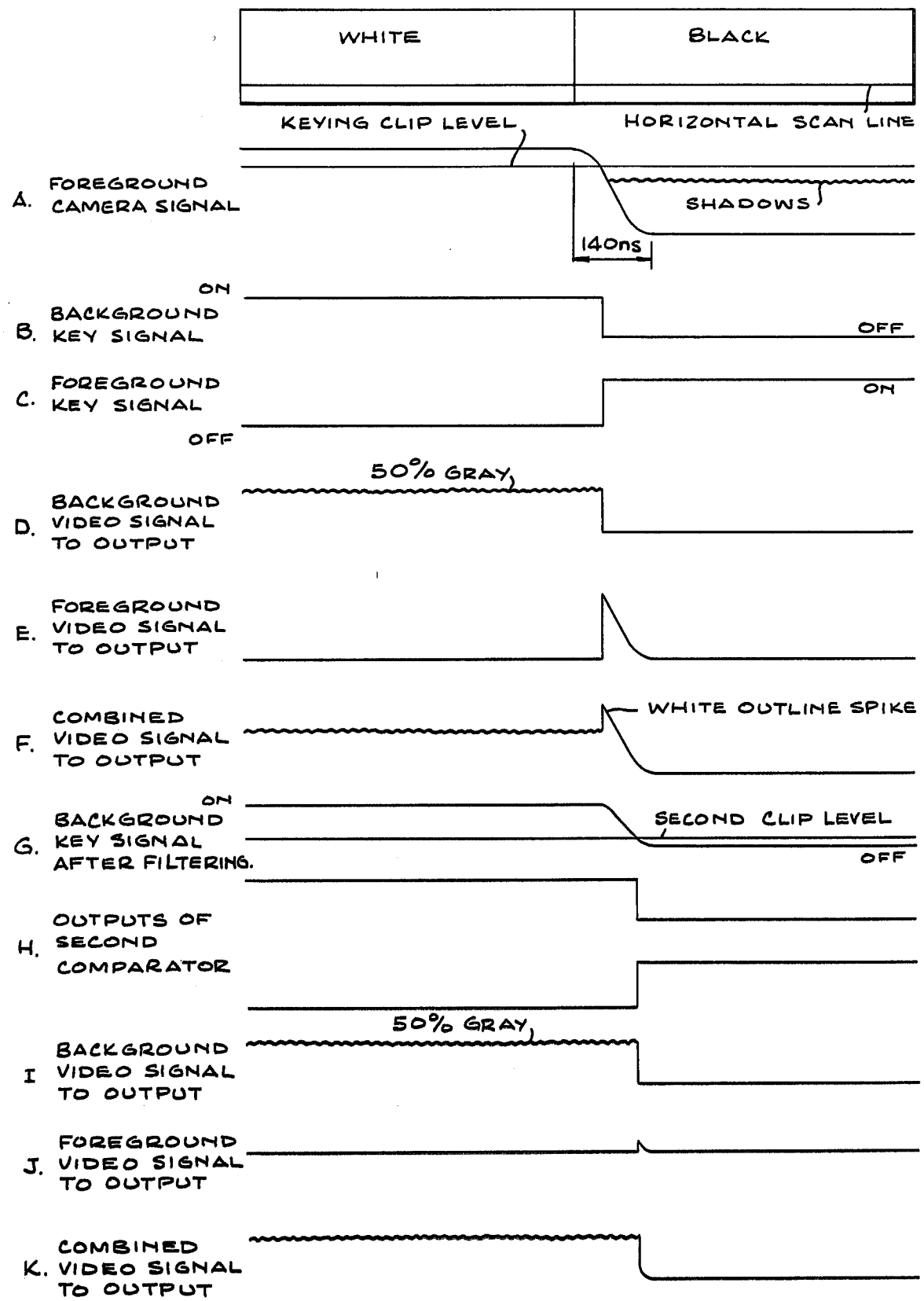

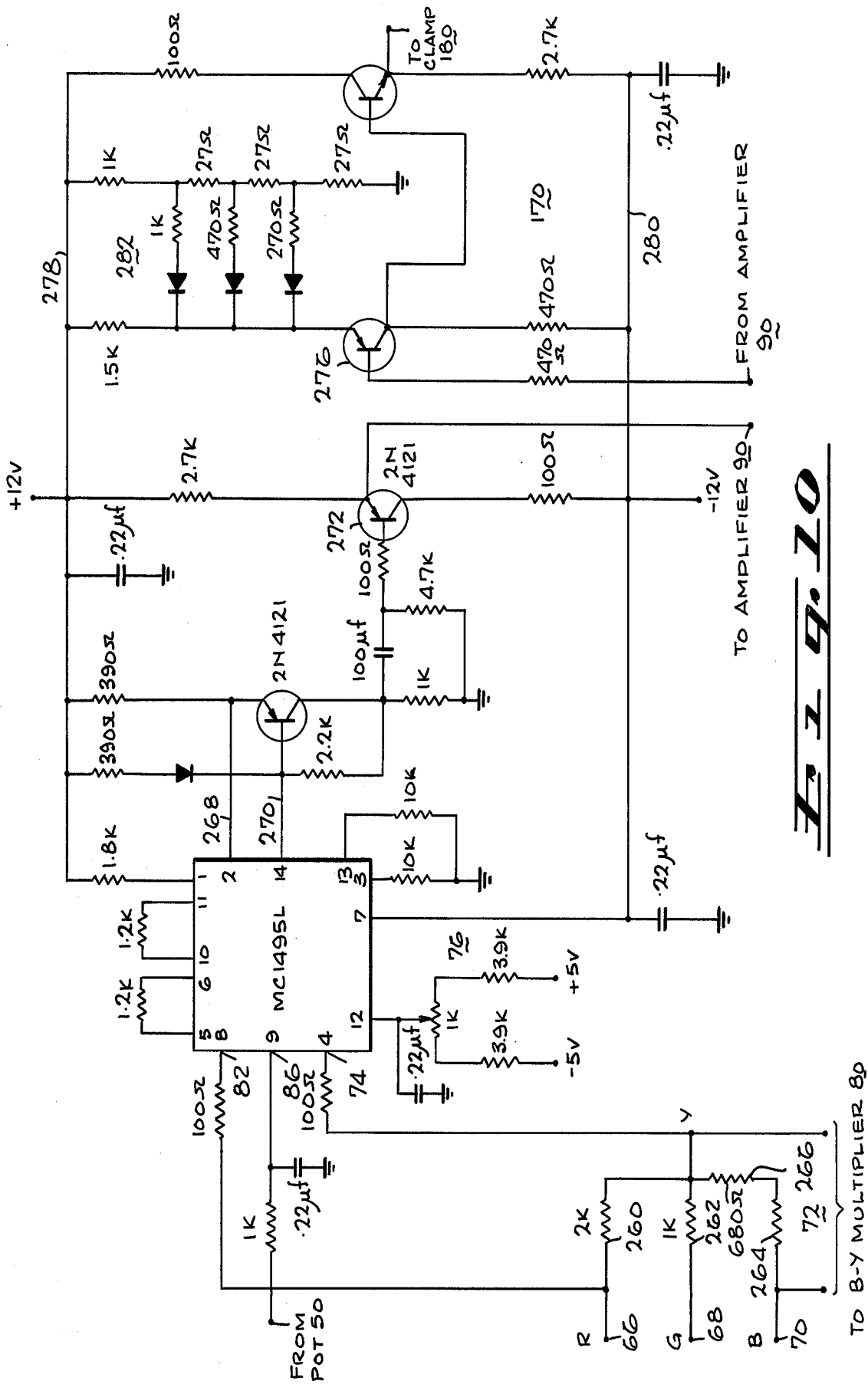

VIDEO TRAVELING MATTE SYSTEM

BACKGROUND OF THE INVENTION

1. Field of the Invention

The present invention relates to electronic systems for generating special effects in color television and color motion pictures and, more particularly, to systems for replacing selected portions of a foreground image with a background image when desired.

2. History of the Prior Art

There are in existence various systems for keying out selected portions of a foreground image such as may be provided by a foreground television camera and replacing the keyed out portions with a background image such as may be provided by a background television camera. Examples of such systems are provided by U.S. Pat. No. 3,778,542, Hanseman, Blue Screen Traveling Matte System, by U.S. Pat. No. 3,595,987, Vlahos, Electronic Composite Photography, by U.S. Pat. No. 3,560,638, Skrydstrup, Chroma Keying System Utilizing Remote Controlled Chroma Keyer, and by a copending application, Ser. No. 443,388, now abandoned filed Feb. 19, 1974, Luminance Key Amplifier, Mendrala.

The Hanseman patent provides an example of a traveling matte system in which the foreground and background signals are algebraically combined such as by use of suppression networks to produce the composite signal. In the particular arrangement shown in the Hanseman patent a color difference signal is derived by subtracting the sum of the red and green components of the foreground signal from twice the value of the blue component. The foreground signal is selectively suppressed by a network which acts to subtract the blue component from the total signal. The background signal components are applied to multipliers where they are selectively suppressed by the color difference signal.

The Vlahos patent provides another example of a traveling matte system. In the arrangement disclosed in the Vlahos patent a color difference signal is derived by subtracting either the green or red component of the foreground signal from the blue component. The foreground and background signals are then gated to an extent proportional to the relationship of the blue and green (or red) components of the foreground signal to provide the composite signal. Unlike Hanseman, the Vlahos arrangement has no provision for varying the keying color in the foreground image. A particular shade of blue is used in all cases.

The Skrydstrup patent provides an example of a keying system in which the output is effectively switched between the foreground and background signals to generate the composite signal. The switching is done electronically and in response to comparison of a selected color in the foreground signal to a reference level. The selected color in the foreground signal is identified by an arrangement which matrixes the red, green and blue components of the foreground signal to provide a luminance signal which is then subtracted from the red and blue components by differential amplifiers. The resulting differences are altered in voltage controlled amplifiers by the outputs of a sine/cosine potentiometer, than combined to provide a signal identifying the presence of the selected color in the foreground signal.

Copending application Ser. No. 443,388 provides another example of a keying system in which the output is effectively switched between the foreground and background signals to generate the composite picture. In that arrangement the red, green and blue components of the foreground signal are matrixed to provide an average thereof which is then compared with a reference value. The results of the comparison are used to key either the foreground signal or the background signal to the output.

Presently known arrangements for mixing foreground and background signals to provide a composite signal suffer from a number of limitations which may prove to be distinctly disadvantageous in certain applications of such systems. One problem with such systems is that they cannot provide for both a shadow capability and the elimination of the outline which frequently occurs between the remaining parts of the foreground image and those parts replaced by the background image. Thus while the arrangement disclosed in copending application Ser. No. 443,388 is effective in preventing the outline, among other reasons because of its processing of the video signals prior to the encoding thereof, such arrangement is a keying system and is therefore incapable of preserving shadow information in the foreground image. Since keying systems by their very nature couple either the foreground signal or the background signal to the output, shadows which appear in portions of the foreground image replaced by the background image disappear since there is no way of varying the background image to preserve the shadows. The background image is either present or not depending on the electronic switching of such systems.

Traveling matte systems, on the other hand, are capable of preserving shadow information because of their capability of proportionally mixing the foreground and background images in the generation of the composite image. Thus where a shadow appears in a portion of the foreground image to be replaced by the background image, various schemes can be used to substitute the background image in such a way that the shadow from the foreground remains. This feature is particularly important, for example, in scenes where the foreground image comprises one or more persons who are photographed against a uniform, colored background and who are to be superimposed on a background taken from a miniature set. If the scene takes place in bright sunlight, for example, the persons in the foreground will almost always cast noticeable shadows. The ability to preserve such shadows when the background image is substituted for the blank background of the foreground image is very important if realism is to be achieved.

While traveling matte systems such as of the type shown in the Hanseman and Vlahos patents are capable of preserving some shadow information from the foreground image, such systems also have a disturbing matte outline between the foreground and background images. The matte outline typically appears as a black or white margin which divides the foreground and background images. In the case of the persons from the foreground image being superimposed on a background image such as may be made from a miniature set, the matte outline appears as a black or white outline surrounding and separating the persons from the background in the composite picture. The matte outline may sometimes be reduced or even eliminated in traveling matte systems by increasing the gain of the background signal and in some cases the foreground signal prior to the combination of such signals to form the composite picture. However as the gain of the background signal is increased the ability to discriminate between shadowed and non-shadowed portions of the foreground image is diminished to the point where the shadow capability of the system is completely lost as a result of substantially minimizing or eliminating the matte outline.

Moreover, even where the gain is set relatively low in traveling matte systems so as to preserve the shadows at the expense of the presence of a matte outline, the shadow capability of such systems is limited. Thus, vivid shadows appearing in the foreground image are typically much less noticeable when reproduced in the background. This is due in part to the non-linear transfer characteristic introduced by most television cameras. While the transfer characteristic of any natural scene is such that the light output on reflection varies linearly with the intensity of input light on the scene, the same is not necessarily true at the television receiver. Picture tubes typically impart a nonlinear transfer characteristic to the darker shades, particularly black. Most television cameras compensate for this by use of a gamma amplifier. However while certain advantages are achieved, the transfer characteristic at the camera output is non-linear. As a result shadowed portions of the original image which are different enough from illuminated portions of the image so as to readily appear in the composite image become less distinguishable from the lighter portions of the image, requiring relatively high levels of illumination of the foreground image before the shadows will be transferred to the composite image. Compounding the problem is the fact that shadowed portions occur in a high gain region of the resulting transfer characteristic, resulting in the presence of considerable noise in the shadows.

Further problems lie in the manner in which the color difference signal is generated in prior art systems. As previously noted the arrangement shown in the Vlahos patent keys only on a particular shade of blue, and the keying color is not variable. In the system shown in the Hanseman patent the keying color is adjustable via a potentiometer. However, such adjustments cannot be made in locations remote from the system because of the presence of video signals in the adjustment process. In the arrangement shown in the Skrydstrup patent the keying color is remotely adjustable via a sine/cosine potentiometer, the outputs of which are applied to voltage controlled amplifiers. However, the resulting color difference signal is subject to drift and other inaccuracies, among other reasons because of the particular circuitry used in Skrydstrup. The differences between the luminance signal and the red and blue color components are obtained using differential amplifiers, following which the resulting difference signals are amplified in the voltage controlled amplifiers in accordance with the signals from the sine/cosine potentiometer. The voltage controlled amplifiers are difficult to control and are subject to drift. Moreover, the gain provided by such amplifiers varies in non-linear fashion.

Accordingly, it would be desirable to provide a system in which the color difference signal is generally immune from drift and other variations and inaccuracies.

It would furthermore be desirable to provide a system which eliminates the matte outline while at the same time preserving shadows in those portions of the foreground image replaced by the background image.

It would still furthermore be advantageous to provide a system in which relatively light shadows in the foreground image are readily detected and reproduced in the composite image without the necessity for greatly increasing the illumination in selected areas of the foreground image.

It would still furthermore be advantageous to provide a system in which shadows in the foreground image which are reproduced in the composite image can be controlled and adjusted electronically.

BRIEF DESCRIPTION OF THE INVENTION

Video traveling matte systems in accordance with the invention generate a color difference signal in highly accurate and relatively error-free fashion by use of multipliers which derive the differences between the red and blue components of the foreground video signal and a luminance signal derived by matrixing the three color components of the foreground video signal and which multiply the differences by the angular position signals from a sine/cosine potentiometer. The outputs of the multipliers are combined to form the color difference signal which identifies the presence of a particular color in the foreground image, the particular color being selected by the potentiometer which can be remotely located where desired.

The combined signal at the outputs of the multipliers is applied to a first comparator where it is compared with a reference level. Generally squarewave pulses are generated whenever the input signal to the comparator exceeds the reference level. In accordance with the invention the width of such pulses is selectively varied so as to eliminate any matte outline between the foreground and background images. In a preferred embodiment the pulses are widened a selected amount by first applying them to an active 4-pole Bessel filter to increase the rise and fall times of the pulses, following which the pulses are applied to a second comparator which compares them with an adjustable reference level. The second comparator operates in the same fashion as the first comparator to generate a generally squarewave pulse at the output each time the input signal thereto exceeds the reference level. The generally squarewave pulses at the output of the second comparator are wider than the pulses at the output of the first comparator by an amount determined in part by the Bessel filter and in part by the reference level of the second comparator. The pulses at the output of the second comparator and the complements thereof are applied to gating circuitry to alternately gate the video signals from foreground and background video signal sources such as television cameras to an output. Electronically, the widened pulses have the effect of extending the background as matted by the foreground so as to eliminate matte outlines which would otherwise be present. The same technique according to the invention is applicable to other types of systems including keying systems in which the composite image is made up by switching between the foreground and background signals. In such systems the widened pulses have the effect of extending the background as keyed by the foreground so as to eliminate outlines or blue halos as would be present in a chroma key system.

In addition to preventing matte outlines from occurring, the invention provides the capability for transferring shadows from the foreground image to the composite image via a portion of the system which applies the color difference signal to limit the pulses at the output of the second comparator prior to application of such pulses to gate the background signal to the output.

The color difference signal is expanded by circuitry which delays such signal so as to coincide in time with the leading edge of the expanded squarewave from the second comparator. This delayed signal is applied to the non-additive mixer both directly and via a further delay causing it to coincide in time with the trailing edge of the expanded squarewave from the second comparator. The resultant signal out of the non-additive mixer may be varied by an adjustable gain control which varies the level of the color difference signal as it is applied to limit the pulses from the output of the second comparator. This combined signal controls the gain of the background signal which is additively mixed with the keyed or switched foreground signal.

In accordance with the invention the non-linear transfer characteristic present in video signals produced by most television cameras is compensated for by circuitry such as a logarithmic amplifier which restores the transfer characteristic of the color difference signal as derived to a linear transfer. This enhances the relative difference between bright areas and shadows in a foreground image, thereby avoiding the necessity for increasing the contrast by illumination of the bright areas of the foreground image so that the shadow information will carry over to the composite picture.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 4 is a block diagram of a portion of the system of FIG. 1 which eliminates matte outlines in accordance with the invention;

FIGS. 5A through 5K are diagrammatic waveforms useful in explaining the operation of the circuits of FIGS. 4 and 6;

FIG. 6 is a block diagram of a portion of the system of FIG. 1 which provides for shadow effects in accordance with the invention;

FIG. 7 illustrates different transfer characteristics useful in explaining the operation of a portion of the circuit of FIG. 6;

FIGS. 8A through 8F are diagrammatic waveforms useful in explaining the operation of the circuit of FIG. 4 in other traveling matte system;

FIGS. 9A through 9K are diagrammatic waveforms useful in explaining the operation of the circuit of FIG. 4 in keying systems;

FIG. 10 is a schematic diagram of portions of the circuits of FIGS. 2 and 6.

DETAILED DESCRIPTION

Figure 1:
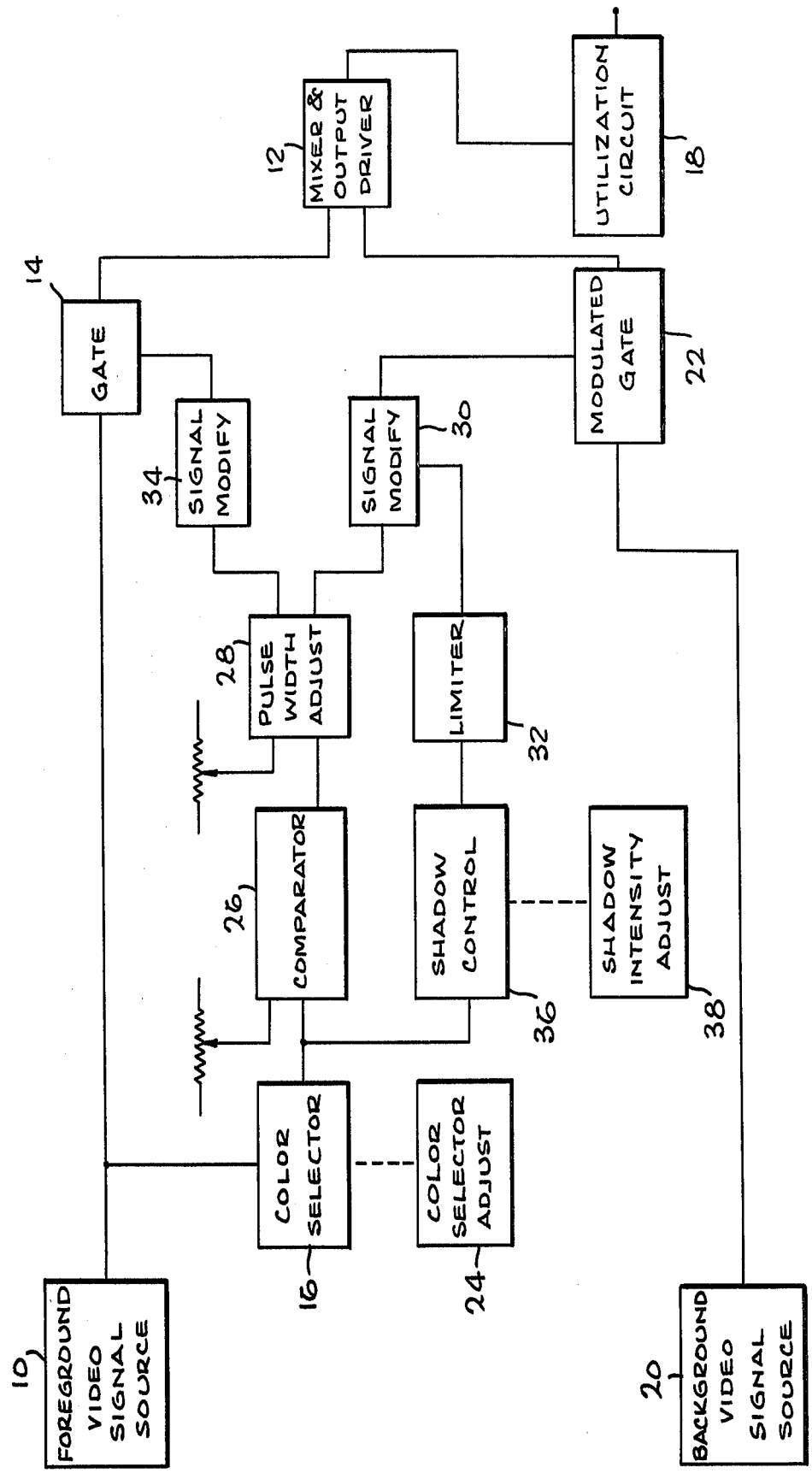
FIG. 1 is a basic block diagram of a video traveling matte system in accordance with the invention.

FIG. 1 illustrates a video traveling matte system in accordance with the invention. The system of FIG. 1 includes a foreground video signal source 10 for providing a foreground video signal to a mixer and output driver 12 via a gate 14 as well as to a color selector 16. The mixter and output driver 12 defines a common output for the system and is coupled to a utilization circuit 18. A background video signal source 20 is coupled to provide a background television signal to the mixer and output driver 12 via a modulated gate 22. The sources 10 and 20 typically comprise television cameras, although they can also comprise flying spot scanners or other appropriate color video sources. The utilization circuit 18 varies depending on the system and may, for example, comprise an encoder, a film recorder, a quantizer or a laser beam recorder.

The color selector 16 responds to the foreground video signal by processing the signal to provide a color difference signal identifying the presence of a selected color within the foreground video signal as determined by a color selector adjust 24. In accordance with the invention and as described hereafter in detail the color selector 16 operates in highly accurate fashion to provide the color difference signal using multipliers.

The color difference signal at the output of the color selector 16 is applied to a comparator 26 wherein it is compared with a reference level. Each time the color difference signal exceeds the reference level a generally squarewave pulse is provided at the output of the comparator 26. In accordance with the invention the widths of pulses produced by the comparator 26 are adjusted by a pulse width adjust 28 to prevent the formation of a matte outline in the composite picture at the mixer and output driver 12. In the present example the width of each pulse is increased by a selected amount to expand the background image into the region normally occupied by the matte outline. The pulses from the comparator 26 as widened by the pulse width adjust 28 are applied to a signal modify 30 where they are limited by signals from a limiter 32 and clipped and filtered prior to being applied to the modulated gate 22 to control the gating of the background video signal from the background source 20 to the mixer and output driver 12. The complements of pulses from the comparator 26 as broadened by the pulse width adjust 28 are clipped and filtered by a signal modify 34 prior to being applied to the gate 14 to control gating of the foreground video signal to the mixer and output driver 12.

In accordance with the invention the color difference signal from the color selector 16 is applied to the limiter 32 via a shadow control 36 to limit the pulses passed to the modulated gate 22 from the pulse width adjust 28 and thereby preserve shadows in the foreground image. The shadow control 36 modifies the color difference signal in accordance with a nonlinear transfer characteristic to compensate for the gamma amplifier within most television cameras which may be used as the foreground source 10. The shadow control 36 also delays the signal by a first amount and then by a second amount, the signal as delayed by the first amount being non-additively mixed with the signal as delayed by both the first and second amounts to compensate for the increase in the width of the pulses from the comparator 26 when such pulses are limited via the limiter 32. A shadow intensity adjust 38 varies the level of the color difference signal in the shadow control 36 to provide for adjustment of the intensity of the shadows. It will be seen that when a shadow in the foreground image is scanned, the shadow control 36 responds by causing limiting of the pulses from the pulse width adjust 28 in the limiter 32 before being passed to the modulated gate 22 via the signal modify 30 to reproduce the shadow in the background image as it is passed via the modulated gate 22 to the mixer and output driver 12 to generate the composite picture.

Figure 2:
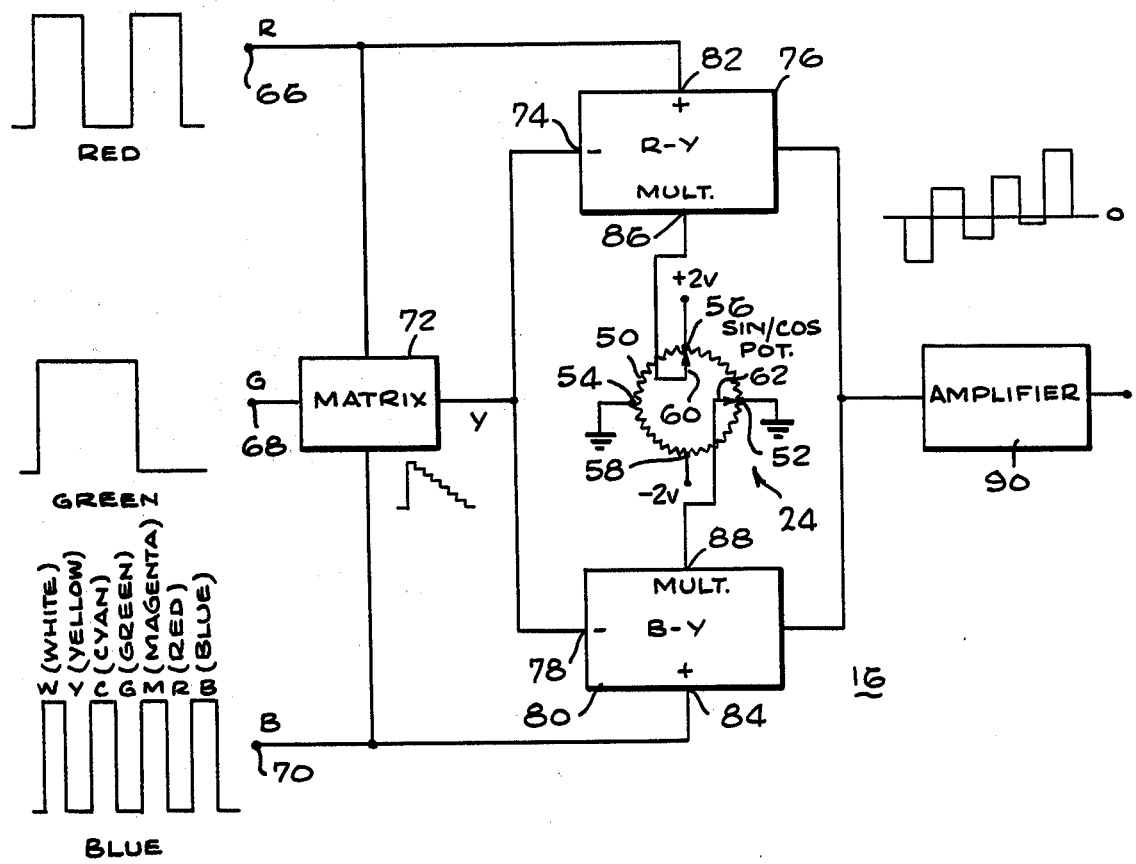
FIG. 2 is a combined block and schematic diagram of a portion of the system of FIG. 1 illustrating the manner in which a color difference signal is generated in accordance with the invention.

The color selector 16 is shown in FIG. 2 together with the color selector adjust 24. In the present example the color selector adjust 24 comprises a sine/cosine potentiometer 50 having the 90° and 270° positions 52 and 54 thereof grounded and the 0° and 180° positions 56 and 58 thereof respectively coupled to positive and negative voltage supplies. The potentiometer 50 is coupled to operate in well-known fashion with a pair of rotatable wiper arms 60 and 62 thereof being rotatable about the potentiometer 50 so as to provide a pair of angularly related signals while at the same time constantly maintaining an orthogonal or 90° relationship with respect to each other.

The red, green and blue components of the foreground video signal are respectively applied to input terminals 66, 68 and 70 of the color selector 16. All three components are applied to a matrix 72 where they are combined to produce a luminance signal Y. The matrix 72 which is shown in detail in FIG. 10 implements the known formula $(0.11B+0.30R=0.59G)=Y$ to produce the luminance signal Y. The luminance signal Y is applied to a negative input 74 of a multiplier 76 and to a negative input 78 of a multiplier 80. The red component from the input terminal 66 is coupled to a positive input 82 of the multiplier 76, while the blue component from the input terminal 70 is applied to a positive input terminal 84 of the multiplier 80. The wiper arm 60 of the sine/cosine potentiometer 50 is coupled to a "multiply" input 86 of the multiplier 76, and the wiper arm 62 of the sine/cosine potentiometer 50 is coupled to a "multiply" input 88 of the multiplier 80.

The input terminals 74 and 82 of the multiplier 76 are differentially coupled so as to present the difference R-Y to the multiplier 76. Similarly the input terminals 78 and 84 of the multiplier 80 are differentially coupled so as to present the difference B-Y to the multiplier 80. The difference R-Y is multiplied by the sine signal from the potentiometer 50 with the resulting product being applied to the input of an amplifier 90. Likewise the difference B-Y is multiplied by the cosine signal from the potentiometer 50 and the resulting product is applied to the input of the amplifier 90 where it is combined with the output signal from the multiplier 76 to produce a color difference signal emphasizing the signals corresponding to a selected color in the foreground signal, relation to the other signals, as determined by the setting of the potentiometer 50.

In the example of FIG. 2 the waveforms for the colors red, green and blue are depicted adjacent the input terminals 66, 68 and 70 respectively. In the event all three such signals are present as shown, the resulting luminance signal Y comprises a perfect stairstep waveform as shown in FIG. 2. If it is assumed that the potentiometer 50 is set so as to select blue as the keying color, then the resulting color difference signal is as shown adjacent the amplifier 90 with the color blue appearing above the zero axis and the colors other than blue appearing below the zero axis. The color difference signal is amplified by the amplifier 90.

Figure 3:
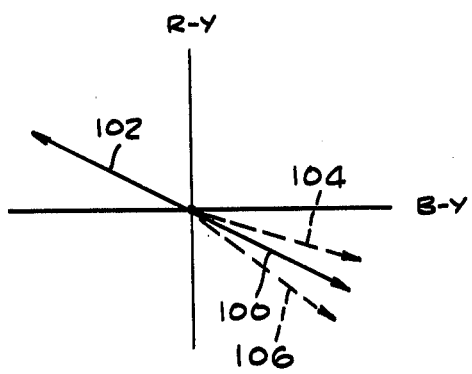
FIG. 3 is a graphical illustration of the color difference signal as derived by the circuit of FIG. 2.

FIG. 3 depicts the color difference signal vectorially with respect to R-Y and B-Y coordinates. The solid vector 100 represents the blue portion above the zero axis while the vector 102 represents the yellow portion below the zero axis. By adjusting the potentiometer 50 any color or hue can be selected. Because the multipliers 76 and 80 are used, the resulting color difference signal is highly accurate and does not drift. In the example of FIGS. 2 and 3 the vector 100 could very well assume either of the positions 104 and 106 shown in dotted outline in FIG. 3 because of the behavior of voltage controlled amplifiers in prior art systems. While such inaccuracies may not be particularly disadvantageous with many prior art systems, they become very disadvantageous with systems according to the invention in which the color difference signal is used to modulate the gating pulses to preserve shadows as briefly described in FIG. 1 and as described in detail hereafter.

FIG. 4 depicts the comparator 26 together with the pulse width adjust 28, the signal modify 30 and the signal modify 34. The color difference signal from the amplifier 90 at the output of the color selector 16 is applied to the comparator 26 together with a reference level as shown in FIG. 4. The comparator 26 generates a generally squarewave pulse each time the color difference signal exceeds the reference level. In accordance with the invention the width of each such pulse is increased to prevent the occurrence of a matte outline between the foreground and background images. In the present example the width of each such pulse is increased in controlled fashion using an active 4-pole Bessel filter 110 and a second comparator 112. The Bessel filter 110 provides the pulse with controlled rise and fall times. The comparator 112 compares the resulting pulse with a reference level and generates a generally squarewave pulse and its complement whenever the pulse at the output of the Bessel filter 110 exceeds the reference level. The pulse at a first output 114 of the comparator 112 is applied to the signal modify 30 which comprises a zero clip 116, a modulated positive clip 118 comprising a part of the limiter 32 and a Bessel filter 120. The complementary pulse output at an output 122 of the comparator 112 is applied to the signal modify 34 comprising a zero clip 124, a positive clip 126 and a Bessel filter 128.

The zero clip 116 clips any part of the pulses at the output 114 below the zero axis prior to passing the pulses to the modulated positive clip 118. The clip 118 clips any part of the pulses above a selected value, and as described in detail hereafter limits the amplitude of the pulses in accordance with the shadow control signal from the limiter 32 and the shadow control 36. The Bessel filter 120 adjusts the rise and fall times of the pulses from the clip 118 to provide constant slopes at each cross-over point where the foreground signal is replaced by the background signal and vice versa. In the present example the Bessel filter 120 provides the pulses with rise and fall times of approximately 80 nanoseconds. This allows the system to be independent of the sharpness of cameras used as the signal sources 10 and 20.

The signal modify 34 operates in a fashion similar to the modify 30 except that the positive clip 126 merely performs clipping and does not perform limiting as in the case of the clip 118. The zero clip 124 clips off any part of the pulses at the output 122 below the zero axis, the positive clip 126 clips away any part of the pulses more than a selected value from the zero axis and the Bessel filter 128 which is identical to the filter 120 provides the pulses with selected rise and fall times. The pulses at the outputs of the Bessel filters 120 and 128 are applied to the gates 22 and 14 respectively to control gating of the background and foreground signals respectively to the mixer and output driver 12.

The operation of the circuit of FIG. 4 may be better understood by referring to the waveforms of FIG. 5. The various waveforms of FIG. 5 correspond to a horizontal scan across a foreground image which is comprised of a non-blue color, then blue with shadows, then yellow, and then a non-blue color. The resulting color difference signal at the output of the color selector 16 is depicted in FIG. 5A. In the event that shadows are present the portion of the waveform of FIG. 5A corresponding to the blue part of the foreground has a reduced amplitude as shown. With the reference or clip level of the first comparator 26 set as shown, a generally squarewave pulse 140 is produced at the output of the first comparator 26 as shown in FIG. 5B. In the present example the Bessel filter 110 is set to provide the leading and trailing edges of each pulse such as the pulse 140 with a rise time and a fall time of approximately 200 nanoseconds. This results in the waveform 142 shown in FIG. 5C. With the clip level of the second comparator 112 set as shown in FIG. 5C, the second comparator 112 produces complementary output pulses 144 and 146 as shown in FIG. 5D.

It will be seen that the pulses 144 and 146 at the output of the second comparator 112 are wider than the pulse 140 at the output of the first comparator 26 by an amount which is determined by the rise and fall times of the pulse 142 at the output of the Bessel filter 110 and the clip level of the second comparator 112. The characteristic of the Bessel filter 110 is chosen and the clip level of the second comparator 112 is set to increase the width of the pulse 140 at the output of the first comparator 26 by an amount which will prevent a matte outline from forming between the foreground and background images in the composite image. Widening of the pulses at the output of the first comparator 26 has the effect of expanding the background image into that area where a matte outline would otherwise form.

The effects of the widened pulses 144 and 146 at the output of the second comparator 112 can be seen in FIGS. 5H, 5I, 5J and 5K. FIG. 5H shows the pulse 144 after being passed through the Bessel filter 120. FIG. 5I shows the pulse 146 after being passed through the Bessel filter 126. As previously noted the filters 120 and 126 determine the rise and fall times of the video signals and provide constant uniform slopes at the cross-over points between foreground and background images. The filters 120 and 126 in the present example provide the generally squarewave pulses 144 and 146 with uniform rise and fall times of approximately 80 nanoseconds. Since the pulses shown in FIGS. 5H and 5I are applied to the gates 22 and 14 to control gating of the background and foreground video signals to the common output, the video signals at the outputs of the gates adopt waveforms closely corresponding to the pulses of FIGS. 5H and 5I as shown in FIG. 5J. Thus while the foreground video signal 148 decreases from its high value to zero in 80 nanoseconds, the background video signal 150 increases from zero to its high value in the same amount of time. Similarly when the horizontal scan passes from the blue background into the yellow background, the foreground video signal again rises to its high value in approximately 80 nanoseconds while the background signal 150 simultaneously decreases to zero. Accordingly the transitions between the foreground and background images are made in quick and positive fashion without the need for varying the gain or otherwise altering the video signals 148 and 150. The composite video signal at the output of the mixer and output driver 12 is shown in FIG. 5K. Because the transitions between foreground and background are accomplished within 80 nanoseconds, the composite video signal of FIG. 5K has very small dips 152 and 154 which in most instances are invisible to the human eye. However, as described hereafter in connection with FIGS. 8 and 9 the much slower transitions of prior art systems result in relatively large dips in the composite video signal, which dips are readily visible as the undesirable matte outline. The present invention has the affect of causing the transitions to occur in a relatively small amount of time space with the remaining space which would normally be taken up by the slower transitions of the prior art being occupied by the widened pulses.

FIG. 6 shows the shadow control 36 and part of the limiter 32. The color difference signal at the output of the color selector 16 is applied to a logarithmic amplifier 170. The function of the logarithmic amplifier 170 can best be understood by referring to the waveforms of FIG. 7.

In naturally occurring scenes or images the transfer characteristic which is a plot of reflected or output light as a function of input light is linear as represented by the curve 171 in FIG. 7. This is also true of the video signal produced by a television camera. However the characteristics of most television receivers are such that the darker shades are unduly emphasized as compared with the lighter shades. To compensate for this most television cameras include a gamma amplifier which distorts the video signal to provide it with a non-linear transfer characteristic at the output of the television camera as shown by the curve 172 in FIG. 7. It will be seen from FIG. 7 that the curve 172 has a constantly changing slope which decreases from a maximum at the lower end of the curve 172 to a minimum at the upper end of the curve 172. A typical slope near the lower end of the curve 172 is represented by the dashed line 173. A typical slope near the upper end of the curve 172 is represented by the dashed line 174. The slope corresponds to gain in that it determines the change in light output which will occur for a given change in light input. Thus a given change in light input in the region of the line 173 will result in a given change in the light output. The same change in light input in a region of the curve 172 near the dashed line 174 will result in much less change in the light output.

If a shadow in the foreground image is sufficiently illuminated so as to lie in the upper portion of the curve 172 where the gain is relatively small, the non-shadow portions of the foreground image although considerably different from the shadow in terms of light input will result in a relatively small difference in the light output. Thus whereas a 2:1 contrast in light input should provide sufficient contrast for distinguishing the shadow, it is necessary in prior art systems because of the transfer characteristic 172 to provide a greater amount of contrast. Shadows which might otherwise lie in an upper region 175 of the curve 172 instead appear in a lower region such as the region 176 of the curve 172 because of the increased contrast which must be provided between shadow and non-shadow portions of the foreground image. The unfortunate result is that shadows are of necessity forced into the lower regions of the curve 172 where the gain and consequent noise are quite high. The noise in this region can be quite disturbing and often appears as a moving graininess in the shadow. At the same time special lighting is required to provide sufficient contrast between the shadow and non-shadow portions of the foreground image. The additional lighting required to provide an illumination ratio of as much as 8:1 between the shadow and non-shadow portions can be very cumbersome and expensive.

The transfer characteristic 172 shown in FIG. 7 cannot be changed if the color balance in the ultimate television receiver is to be preserved. However the present invention takes advantage of the fact that video signals which are not used to make up the composite video signal can be so altered. In the present invention the color difference signal from the color selector 16 which is applied to the shadow control 36, the limiter 32 and ultimately the signal modify 30 is used to control shadows in the composite video signal and does not form a part of the composite video signal. Accordingly the transfer characteristic of the signal can and is advantageously changed by the log amplifier 170 within the shadow control 36. The log amplifier 170 has a transfer characteristic shown by the curve 177 in FIG. 7. This characteristic algebraically combines with the characteristic of the color difference signal from the color selector 16 as represented by the curve 172 to provide the signal with a linear characteristic as shown by the curve 171. Since the gain remains generally uniform along the entire length of the curve 171 there is no particular need to control the illumination of the shadows to bring them within a particular part of the curve. Moreover the required contrast between shadow and non-shadow portions of the foreground is greatly reduced and is on the order of no more than 2:1 for most applications. This means that the shadow and non-shadow portions of the foreground image can be relatively close to one another on the light input scale of FIG. 7 and can accordingly be located at different portions of the length of the curve 171. This fact is taken advantage of to eliminate imperfections such as paint brush or roller marks in the blue background of the foreground image. To do this the background of the foreground image is illuminated to a relatively high value initially, placing it relatively high on the curve 171. The foreground image is then further illuminated so that non-shadow portions of the background have about twice the illumination of the shadow portions, and are even higher on the curve 171. The result is that imperfections in the background of the foreground image are eliminated.

A further advantage provided by the linear characteristic 171 according to the invention lies in the fact that the gain which is uniform along the length of the curve 171 is considerably less than the gain along the lower portions of the curve 172. The result is that the effects of noise are considerably reduced regardless of where the shadows are located along the curve 171.

Referring to FIG. 6 the color difference signal as modified by the log amplifier 170 is applied to a clamp 180 which performs the function of DC restoration in response to horizontal sync pulses. From the clamp 180 the signal is applied to a delay 182 where it is delayed by a first amount to compensate for widening of the pulses at the output of the first comparator 26. The signal as delayed by the delay 182 is then applied to an emitter follower 84 which has a high input impedance and a low output impedance to aid in driving a pair of inputs 186 and 188 to a non-additive mixer 190. The output of the emitter follower 184 is coupled directly to the input 186 and through a delay 192 to the input 188. The delay 192 operates to delay the signal from the first delay 182 by a second amount. The mixer 190 functions to non-additively mix the color difference signal from the log amplifier 170 as delayed by the first amount from the delay 182 with the color difference signal from the log amplifier 170 as delayed by both the first amount from the delay 182 and the second amount from the delay 192. This has the effect of expanding the color difference signal to compensate for the delays introduced by the Bessel filters 120 and 128.

The output of the non-additive mixer 190 is applied to a remote gain circuit having the shadow intensity adjust 38 coupled thereto. By manipulating the shadow intensity adjust 38 the remote gain 192 varies the level of the signal at the output of the mixer 190 to provide for adjustment of the intensity of the shadows. The output of the remote gain 102 is amplified by an amplifier 194 to compensate for any signal losses up to that point prior to being applied to a clamp 196. The clamp 196 provides for adjustment of the signal to complement the modulated positive clip 118 where the shadow control signal from the clamp 196 is applied to limit the broadened pulses from the output of the second comparator 112.

The operation of the circuit of FIG. 6 may be better understood by referring to FIGS. 5E, 5F and 5G. As shown in FIG. 5E the positive pulse portion 210 of the color difference signal at the output of the color selector 16 as altered by the log amplifier 170 is delayed by the first delay 182. The pulse 210 as delayed by the second delay 192 is shown in dotted outline 212 in FIG. 5E. Non-additive mixing of the pulses 210 and 212 of FIG. 5E results in the pulse 214 shown in FIG. 5F. It will be seen that the positive pulse of the color difference signal has been shifted by the first delay 182 and expanded using the second delay 102 and the non-additive mixer 190 while at the same time maintaining the shadow information. The fine detail lost during the mixing operation is of no consequence since the resulting signal is used only to limit other pulses used to control the video signals and in view of the fact that as a general rule shadows contain little in the way of fine detail. The signal shown in FIG. 5F is applied to the modulated positive clip 118 to limit the pulses produced by the second comparator 112. The positive pulse 144 at the output of the second comparator 112 as shown in FIG. 5D is shown in its limited form in FIG. 5G. In the absence of shadows in the foreground image the pulse 214 of FIG. 5F has little or no effect on the pulse 144 of FIG. 5G. However if shadow information 216 is present in the pulse 214, such information limits the pulse 144 to provide the pulse with a waveform 218 as shown in FIG. 5G. Since the pulse 144 is subsequently applied to gate the background video signal to the output, the waveform 218 causes the shadows from the foreground image to be reproduced in the combined image.

The manner in which the principles of the present invention may be incorporated into prior art systems of the traveling matte type to eliminate the matte outline may be understood by referring to the waveforms of FIG. 8. In prior art traveling matte systems such as of the type previously referred to in the Hanseman patent, each video signal typically takes about a 140 nanoseconds to increase from zero to its high value or to decrease from its high value to zero. FIG. 8A shows a typical background video signal in such a system as the signal increases from zero to its high value and then decreases to zero. If shadow information is contained within the resulting pulse as shown in FIG. 8A the clip level of the comparator which effects a transition between the foreground and background signals must be set at a relatively high level to insure that the shadow information is retained. This results in a transition of approximately 140 nanoseconds duration as shown in FIG. 8B. Because of the relatively long transition the resulting composite video signal has a relatively large dip which shows up as a large and plainly visible matte outline in the composite picture.

If the foreground and background gain are substantially increased as shown by the dotted outlines in FIG. 8B, the practical result is to adjust the clip level to a much lower level with respect to the signal of FIG. 8A. This has the effect of reducing the transition time to a value much smaller than 140 nanoseconds such as 80 nanoseconds as shown in FIG. 8C. The resulting composite video signal has a very small dip, providing substantial elimination of the matte outline. However, at the same time the shadow information has been lost since, as seen in FIG. 8A, the adjusted clip level is substantially below the top of the shadow information waveform.

In accordance with the invention a Bessel filter and a second comparator can be added to such prior art systems so as to eliminate the matte outline. With the clip level of the first comparator set as shown in FIG. 8A a generally squarewave pulse is generated as shown in FIG. 8D. Application of the pulse of FIG. 8D to the Bessel filter results in the signal shown in FIG. 8E. By setting the clip level of the second comparator as shown in FIG. 8E, the generally squarewave pulse of FIG. 8F results. The widened pulse of FIG. 8F and its complement may then be applied to gate the foreground and background video signals so that the resulting composite picture has no matte outline.

In accordance with the invention an outline between the foreground and background images can be prevented in prior art keying systems by widening the pulses such as by use of a Bessel filter and a second comparator. Although the electronic switching apparatus in keying systems is capable of switching very rapidly, it still takes each video signal approximately 140 nanoseconds to increase from zero to its high value or to decrease from its high value to zero.

FIG. 9A illustrates the video signal generated by the foreground camera in a keying system as the result of a horizontal scan of a portion of a foreground image which is white and then black. In the present example the keying system is assumed to be of the type described in copending application Ser. No. 443,388 where keying is determined by comparison of the average intensity of the foreground image with a threshold value defined by a keying clip level. It will be seen from FIG. 9A that as the horizontal scan passes the border between white and black in the foreground image, the foreground camera signal decreases from its high value to its low value over a period of time which is approximately 140 nanoseconds. The keying clip level must be maintained at a relatively high level to avoid losing shadow information in the foreground image as shown in FIG. 9A.

As the foreground camera signal drops below the keying clip level, the background and foreground key signals, shown in FIGS. 9B and 9C respectively, change value. The background key signal of FIG. 9B changes from an "on" condition to an "off" condition. Conversely the foreground key signal of FIG. 9C changes from the "off" to the "on" condition. The changes in the key signals of FIGS. 9B and 9C are the result of electronic switching and occur almost instantaneously as compared with the 140 nanoseconds required for the foreground camera signal to decrease from maximum to minimum values. If it is assumed for purposes of the present example that the background image during scan of the white portion of the foreground image is gray so as to result in a video signal having approximately 50% or half of its maximum possible value, the resulting background video signal at the system output is illustrated in FIG. 9D. As seen in FIG. 9D the background video signal remains approximately at its 50% value until the foreground camera signal decreases below the keying clip level, at which point the background video signal drops to zero. The foreground video signal at the system output is shown in FIG. 9E. During the horizontal scan of the white color in the foreground image, the foreground image is replaced by the background image and the foreground video signal at the output assumes zero value as seen in FIG. 9E. However, as the foreground camera signal becomes less than the keying clip level as seen in FIG. 9A, the foreground video signal at the output as shown in FIG. 9E increases very rapidly and thereafter closely simulates the remainder of the foreground camera signal of FIG. 9A.

Since the keying clip level must be maintained relatively high to preserve shadow information, the clipping point of the foreground camera signal occurs at a point at which the foreground camera signal still has approximately 75% of its maximum value. Consequently when the background and foreground video signals at the output are combined as shown in FIG. 9F, the foreground video signal provides the resulting combined signal with a pronounced spike at the transition between background and foreground. This spike results in a pronounced white outline between the background and foreground images.

In accordance with the invention the white outline is eliminated by use of appropriate circuitry for effectively broadening the background signal. In the present example a Bessel filter and a second comparator are added. FIG. 9G shows the background key signal of FIG. 9B after being passed through the Bessel filter. With the clip level of the second comparator set at a relatively low level as shown, the complementary outputs of the second comparator are as shown in FIG. 9H. The resulting background and foreground video signals are shown in FIGS. 9I and 9J respectively. As seen in FIG. 9I the shifted transition points in the background and foreground key signals of FIG. 9H have the effect of displacing the point at which the background video signal at the output decreases from the 50% gray value to zero. In the case of the foreground video signal at the output as shown in FIG. 9J the shifted transitions have the effect of switching in the foreground video signal to replace the background video signal at a point when the foreground camera signal of FIG. 9A has decreased almost to zero. At the same time shadow information has not been lost since the initial keying clip level continues to remain at the high level as shown in FIG. 9A. Again the practical result is to effectively broaden the background so as to eliminate an outline between foreground and background images. This may be seen from FIG. 9K which shows the signals of FIGS. 9I and 9J as combined.

A schematic circuit comprising a part of the color selector 16 and the shadow control 36 is shown in FIG.

10. Specifically, the circuit of FIG. 10 comprises the matrix 72, the R-Y multiplier 74, and the logarithmic amplifier 170.

The maxtrix 72 comprises a network of resistors 260, 262, 264 and 266 coupled together in well-known fashion to produce the luminance signal Y. The luminance signal Y is applied to the negative input 74 comprising the No. 4 pin of an integrated circuit of the type sold under the numerical designation MC1495L by Motorola Radio Corporation. The positive input 82 is coupled to receive the red color component and comprises the No. 8 pin of the integrated circuit. The No. 9 pin of the integrated circuit comprises the multiplication input 86 which is coupled to the sine/cosine potentiometer 50. The integrated circuit multiplies the difference between signals at the inputs 82 and 74 by the signal at the input 86 and passes the result to a pair of push-pull outputs 268 and 270 at pin No. 2 and pin No. 14 respectively. The resulting output signal is passed via an emitter follower 272 to the amplifier 90. The B-Y multiplier 80 which is not shown in FIG. 10 is identical in configuration to the R-Y multiplier 76.

The logarithmic amplifier 170 includes a transistor 276 having the base thereof coupled to receive the color difference signal from the zero clip 94. The conductive path of the transistor 276 is coupled between opposite positive and negative voltage supply buses 278 and 280 with the emitter side of the transistor also being coupled to a network 282 of resistors and diodes. The network 282 functions in conjunction with the transistor 276 to operate logarithmically in response to the input signals and thereby provide the characteristic shown in FIG. 7.

Figure 11:
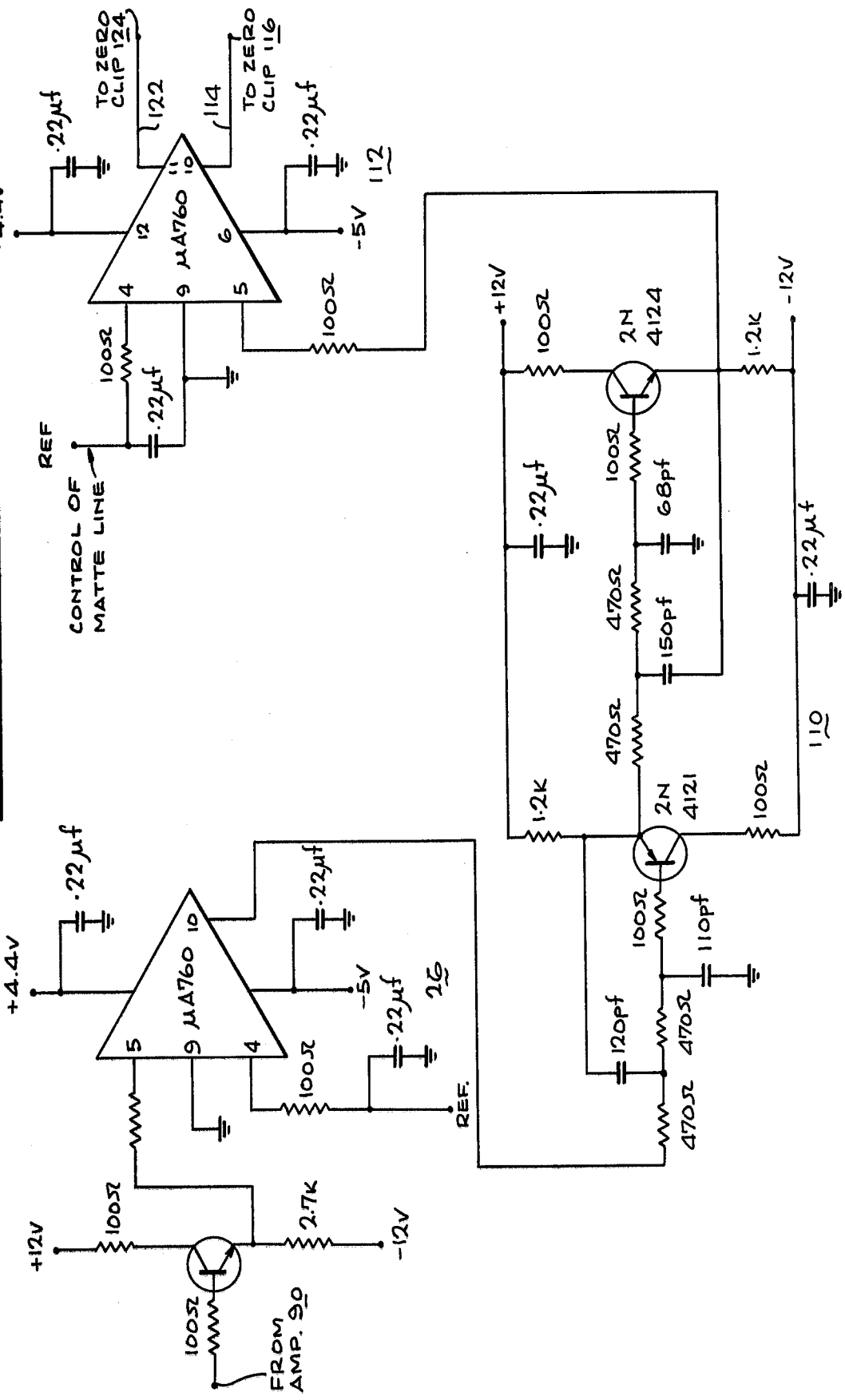
FIG. 11 is a schematic diagram of portions of the circuit of FIG. 4.

FIG. 11 provides an example of a schematic circuit comprising the first comparator 26, the Bessel filter 110 and the second comparator 112. As shown in FIG. 11 each of the comparators 26 and 112 is comprised principally of an integrated circuit sold under the numerical designation A760 by Motorola Radio Corporation. Pin No. 4 of the integrated circuit is coupled to receive the reference level in each case, while pin No. 5 is coupled to receive the input signals to be compared. The single output pulse at pin No. 10 of the integrated circuit comprising the first comparator 26 is coupled directly to the Bessel filter 110. In the case of the integrated circuit comprising the second comparator 112, pin Nos. 10 and 11 comprise the outputs 114 and 122 respectively and provide the true and complementary pulses. The Bessel filter 110 is of conventional design and comprises an active 4-pole filter with a Bessel response. The Bessel filters 120 and 128 at the outputs of the signal modifies 30 and 34 are of identical configuration with the values of the capacitors being changed to provide a different response time.

While the invention has been particularly shown and described with reference to a preferred embodiment thereof, it will be understood by those skilled in the art that various changes in form and details may be made therein without departing from the spirit and scope of the invention.

What is claimed is:

1. In an arrangement in which the video signal from a first source is processed and thereafter compared with a reference in comparator means to generate generally squarewave pulses, the pulses controlling the relative gating of the video signal from the first source and a video signal from a second source to an output, the improvement comprising means for increasing the width of each pulse generated by the comparator means by a selected amount to prevent formation of a matte outline in a composite image generated by the video signals from the first and second sources, and means associated with the means for increasing the width of the pulse controlling the width increase to a selected amount sufficient to expand an image created from one of said signals into a region normally occupied by the matte outline.

2. The invention defined in claim 1, wherein the means for increasing the width of each pulse generated by the comparator means comprises filter means coupled to alter the rise and fall times of each pulse generated by the comparator means and second comparator means coupled to compare each pulse as altered by the filter means with an adjustable reference to provide generally squarewave pulses.

3. The invention defined in claim 2, wherein the filter means comprises an active, four pole Bessel filter.

4. An arrangement for selectively gating the video signals from first and second video signal sources to an output comprising:
 means for processing the video signal from the first source to emphasize selected signal components of the video signal;
 comparator means for comparing the processed video signal with a reference, the comparator means generating pulses when the processed video signal exceeds the reference;
 means response to each pulse generated by the comparator means for increasing the width of the pulse by a selected amount to prevent formation of a matte outline in a composite image derived from the video signals from the first and second sources, said selected amounts being sufficient to expand an image created from one of said signals into a region normally occupied by the matte outline.

5. The invention defined in claim 4, further including means response to the processed video signal for expanding the processed video signal, and means for applying the expanded processed video signal to modulate the pulses of increased width prior to gating of the video signals from the first source to the output.

6. The invention defined in claim 5, further including means responsive to the processed video signal for altering the processed video signal in accordance with a predetermined transfer characteristic prior to applying the processed video signal to the means for expanding.

7. An arrangement for seclectively gating video signals from foreground and background video signal sources to an output comprising:
 means responsive to the video signal from the foreground source for generating a signal emphasizing selected video components of the video signal from the foreground source;
 means for comparing the signal emphasizing the selected video components with a reference, the means for comparing generating a pulse whenever the signal emphasizing the selected video components exceeds the reference;
 means for widening each pulse generated by the means for comparing by a selected amount;
 first gating means coupled to control the passage of the video signal from the foreground source to the output in accordance with an input signal applied thereto;
 means for applying the pulses from the means for widening as the input signal to the first gating means;

second gating means coupled to control the passage of video signals from the background source to the output in accordance with an input signal applied thereto; and signal modifying means also receiving pulses from the means for widening, said signal modifying means limiting said pulses and applying the complement of the pulses from the means for widening as an input signal to said second gating means to control gating of the background video signal.

8. The invention defined in claim 7, wherein the signal modifying means for applying the pulses from the means for widening as the input signal to the first gating means comprises means for limiting the pulses from the means for widening in accordance with the signal emphasizing selected video components and means for applying the limited pulses as the input signal to the second gating means.

9. The invention defined in claim 8, further including a logarithmic amplifier coupled to amplify the signal emphasizing selected video components prior to application to the means for limiting.

10. The invention defined in claim 8, further including means for varying the level of the signal emphasizing selected video components prior to application to the means for limiting.

11. The invention defined in claim 8, further including means expanding the signal emphasizing selected video components prior to application to the means for limiting.

12. In an arrangement in which the video signal from a foreground television camera is processed to emphasize selected signal components of the video signal, the arrangement generating a color difference signal based on the emphasized selected signal components, the video signal as so processed being applied to first and second gating means to respectively gate the video signal from the foreground television camera to an output, the improvement comprising means responsive to the processed video signal for altering the processed video signal in accordance with a predetermined non-linear transfer characteristic selected so that the characteristics of the color difference signal and the non-linear transfer characteristic are algebraically combined to provide a signal with a linear characteristic, and means for applying the processed video signal as altered in accordance with a linear characteristic to limit the processed video signal as it is applied to the second gating means to gate the video signal from the background television camera.

13. The invention defined in claim 12, wherein the means for altering comprises a logarithmic amplifier.

14. An arrangement for selectively gating video signals from the foreground and background video signal sources to an output comprising:
means responsive to a video signal from the foreground source to emphasize selected signal components of the video signal from the foreground source;
means for comparing the signal emphasizing selected signal components of the video signal with a reference, the means for comparing generating a pulse whenever the signal emphasizing selected signal components exceeds the reference;
means responsive to each pulse generated by the means for comparing for generating a complementary pulse;

first gating means coupled to control the passage of the video signal from the foreground source to the output in accordance with the complementary pulse;

means for limiting each pulse generated by the means for comparing in accordance with the signal emphasizing selected signal components, said means for limiting pulses generates such limited pulses essentially simultaneously with the generation of the complementary pulses; and second gating means coupled to control the passage of the video signal from the background source to the output in accordance with limited pulses from the means for limiting.

15. The invention defined in claim 14, further including a variable gain control coupled to vary the level of the signal emphasizing selected signal components of the video signal prior to limiting of pulses generated by the means for comparing.

16. The invention defined in claim 14, further including means for latering the signal emphasizing selected signal components of the video signal in accordance with a predetermined non-linear transfer characteristic prior to limiting of pulses generated by the means for comparing.

17. An arrangement for providing a composite video signal comprising:
a means for generating a foreground video signal;
a means for generating a background video signal;
means responsive to the foreground video signal for generating a signal to emphasize selected signal components in the foreground video signal, said means including means for matrixing components of the foreground video signal to provide a combined signal, sine/cosine potentiometer means for generating angularly related signals, multipliers for multiplying the differences between components of the foreground video signal and the combined signal by the angularly related signals, and means for combining outputs of the multipliers to provide the signal emphasizing the selected signal components in the foreground video signal;
first means for comparing the signal emphasizing the selected signal components with a reference, the first means for comparing generating a first generally squarewave pulse whenever the signal emphasizing the selected signal components exceeds the reference;
means for filtering each generally squarewave pulse to provide the pulse with selected rise and fall times;
second means responsive to each filtered generally squarewave pulse for comparing the filtered generally squarewave pulse with a reference pulse, the second means for comparing generating a second generally squarewave pulse and the complement thereof whenever the filtered generally squarewave pulse exceeds the reference;
second means for filtering the complement of each second generally squarewave pulse to provide the pulse with selected rise and fall times;
a common output;
a first gate coupled between the means for generating a foreground video signal and the common output, the first gate being operative to gate the video signal from the means for generating a foreground video signal to the common output in accordance with the complement of each second generally squarewave pulse as filtered by the second means for filtering;

means coupled to limit each second generally squarewave pulse in accordance with the signal emphasizing the selected signal components;

third means for filtering each generally squarewave pulse as limited by the means coupled to limit to provide the pulse with selected rise and fall times; and a second gate coupled between the means for generating a background video signal and the common output, the second gate being operative to gate the video signal from the means for generating a background video signal to the common output in accordance with each second generally squarewave pulse as filtered by the third means for filtering.

18. The invention defined in claim 17, wherein the means coupled to limit each second generally squarewave pulse comprises first delay means for delaying the signal representing a selected color by a first amount, second delay means for delaying the signal representing a selected color as delayed by the first amount by a second amount, means for non-additively mixing the signal representing a selected color as delayed by the first amount with the signal representing a selected color as delayed by the first and second amounts to provide a limiting signal, means for adjusting the level of the limiting signal, and means for applying the adjusted limiting signal to limit each second generally squarewave pulse.

19. The invention defined in claim 18, further including a logarithmic amplifier coupled to amplify the signal representing a selected color prior to delay of the signal by the first delaying means.

20. A method in which the video signal from a first source is processed, thereafter comparing the processed video signal with a reference in a comparator means to generate generally squarewave pulses, using the pulses for controlling the relative gating of the video signal from the first source and a video signal from a second source to an output, increasing the width of each pulse generated by the comparator means by a selected amount to prevent an outline between the video signals from the first and second sources.

21. The method defined in claim 20 wherein the rise and fall times of each pulse generated by the comparator means is altered and each pulse as altered is compared with an adjustable reference to provide generally squarewave pulses.

22. The method in accordance with claim 20 wherein the video signals comprise first and second video signals from first and second video signal sources and which are selectively gated to an output, wherein:

the comparing of the processed video signal with said reference in said comparator means enables generation of pulses when the processed video signal exceeds the reference; and alternately gating the video signals from the first and second sources to the output under control of the pulses of increased width.

23. The method defined in claim 22, further comprising expanding the processed video signal, and applying the expanded processed video signal to modulate the pulses of increased width prior to gating of the video signals from the first source to the output.

24. The method defined in claim 23 further including altering the processed video signal in accordance with a predetermined transfer characteristic prior to applying the processed video signal.

25. The method defined in claim 22 wherein the first signals are foreground signals and the second signals are background signals which are selectively gated from foreground and background video signal sources to an output, said method further comprising:

generating a signal identifying the presence of a selected color in the video signal from the foreground source;

the comparison operation comprising comparing the signal identifying the presence of a selected color with a reference and generating a comparison pulse whenever the signal identifying the presence of a selected color exceeds the reference;

controlling the passage of the video signal from the foreground source from a first gating means to the output in accordance with an input signal applied thereto;

applying the pulses of increased width as the input signal to the first gating means;

controlling the passage of video signals from the background source from a second gating means to the output in accordance with an input signal applied thereto; and applying the complement of the pulses of increased width as the input signal to the second gating means.

26. The method defined in claim 25 wherein the method comprises limiting the pulses of increased width in accordance with the signal identifying the presence of a selected color, and applying the limited pulses as the input signal to the first gating means.

27. The method defined in claim 26 further including amplifying the signal identifying the presence of a selected color in a logarithmic amplifier prior to application of the limited pulses to the first gating means.

28. The method defined in claim 27 further including varying the level of the signal identifying the presence of a selected color prior to application of the limited pulses to the first gating means.

29. The method defined in claim 27 further including expanding the signal identifying the presence of a selected color prior to application of the limited pulses to the first gating means.

30. A method for selectively gating the video signals from first and second video signal sources to an output, comprising:

processing the video signal from the first source to to emphasize selected signal components of the video signal;

comparing the processed video signal with a reference in a comparator means and generating pulses when the processed video signal exceeds the reference;

increasing the width of each pulse by a selected amount in response to each pulse generated by the comparator means; and alternately gating the video signals from the first and second sources to the output under control of the pulses of increased width.

31. An arrangement for selectively gating the video signals from first and second video signal sources to an output comprising:

means for processing the video signal from the first source to emphasize a selected signal component of the video signal;

comparator means for comparing the processed video signal with a reference, the comparator means generating pulses when the processed video signal exceeds the references;

means responsive to each pulse generated by the comparator means for producing pulses of increased width where the width of the pulse is increased by a selected amount to prevent formation of a matte outline in a composite image derived from the video signals from the first and second sources, said selected amount being sufficient to expand an image created from one of said signals into a region normally occupied by the matte outline;

first delay means for compensating for the pulses of increased width by a first delay amount, second delay means to delay the pulses from the first delay means by a second delay amount;

means for non-additively mixing pulses as delayed by a first delay amount with pulses as delayed by the second delay amount; and gating means coupled to alternately gate the video signals from the first and second sources to the output under control of the pulses of increased width.

32. In an arrangement in which the video signal from a foreground television camera is processed to generate a color difference signal to emphasize selected signal components of the video signal, the arrangement generating a color difference signal based on the signal emphasizing selected signal components, the video signal as so processed being applied to first and second gating means to respectively gate the video signal from the foreground television camera and a video signal from a background television camera to an output, the improvement comprising means responsive to the processed video signal for altering the processed video signal in accordance with a predetermined non-linear transfer characteristic selected so that characteristics of the color difference signal and non-linear characteristics are algebraically combined to provide a signal with a linear characteristic, said last named means being operative with means for generating pulses of increased width, first delay means to compensate for the pulses of increased width by a first delay amount, second delay means to delay the pulses from the first delay means by a second amount;

said means for altering the processed video signal through said algebraically combining the characteristics of the color difference signal with the nonlinear transfer characteristic permits such combining in accordance with the delay by the first and second amounts to provide said signal with a linear characteristic; and means for applying the processed video signal as altered in accordance with a linear characteristic to limit the processed video signal as it is applied to the second gating means to gate the video signal from the background television camera.

33. The invention defined in claim 32 further characterized in that said improvement comprises shadow intensity adjust means for adjusting the intensity of shadows caused by the video signal as processed.

34. An arrangement for selectively gating video signals from foreground and background video signal sources to an output comprising:

means responsive to the video signal from the foreground source for generating a signal to emphasize selected signal components in the video signal from the foreground source;

means for comparing the signal emphasizing selected signal components with a reference, the means for comparing generating a pulse whenever the signal emphasizing selected signal components exceeds the reference;

means responsive to each pulse generated by the means for comparing the generating a complementary pulse;

means responsive to the complementary pulse for increasing the width thereof by a selected amount to aid in prevention of matte outline;

first gating means coupled to control the passage of the video signal from the foreground source to the output in accordance with the complementary pulse as widened;

means for limiting each pulse generated by the means for comparing in accordance with the signal emphasizing selected signal components, said means for limiting each pulse generating the limited pulses essentially simultaneously with the generation of the complementary pulses; and second gating means coupled to control the passage of the video signal from the background source to the output in accordance with limited pulses from the means for limiting.

* * * * *